US009623817B2

(12) United States Patent
Welchko et al.

(10) Patent No.: US 9,623,817 B2
(45) Date of Patent: Apr. 18, 2017

(54) METHOD AND SYSTEM FOR CONTROLLING ELECTRICAL SYSTEMS OF VEHICLES

(75) Inventors: Brian A. Welchko, Torrance, CA (US); Silva Hiti, Redondo Beach, CA (US); Abbas Raftari, West Bloomfield, MI (US); Jeong J. Park, Ann Arbor, MI (US); Hanne Buur, Brighton, MI (US); Wei D. Wang, Troy, MI (US); Brian R. Medema, Waterford, MI (US); William R. Cawthorne, Milford, MI (US); Jackie L. Cui, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1862 days.

(21) Appl. No.: 12/704,614

(22) Filed: Feb. 12, 2010

(65) Prior Publication Data

US 2011/0202211 A1 Aug. 18, 2011

(51) Int. Cl.
*G06F 7/00* (2006.01)
*B60R 16/03* (2006.01)
*B60W 10/08* (2006.01)
*B60W 20/11* (2016.01)

(52) U.S. Cl.
CPC ............ *B60R 16/03* (2013.01); *B60W 10/08* (2013.01); *B60W 20/11* (2016.01); *B60L 2240/423* (2013.01); *B60W 2710/083* (2013.01); *Y02T 10/642* (2013.01)

(58) Field of Classification Search
CPC ....... B60R 16/03; B60W 20/11; B60W 10/08; B60W 2710/083; Y02T 10/642; B60L 2240/423

USPC ........ 701/22, 29, 43, 91, 102; 123/479, 564; 710/18, 19; 714/2–12, 18, 25, 30, 32, 37, 714/39, 48; 318/138, 254, 439, 700, 701; 712/43

See application file for complete search history.

(56) References Cited

U.S. PATENT DOCUMENTS

| 4,615,321 | A | * | 10/1986 | Haefner et al. ............... 123/479 |
| 4,797,828 | A | * | 1/1989 | Suzuki et al. ................ 701/102 |
| 4,881,227 | A | * | 11/1989 | Buhren .......................... 714/11 |
| 5,436,837 | A | * | 7/1995 | Gerstung et al. ............... 701/29 |

(Continued)

OTHER PUBLICATIONS

Chinese Patent Office, Office Action in Chinese Patent Application No. 201110036179.2, dated Apr. 3, 2013.

*Primary Examiner* — Jerrah Edwards
*Assistant Examiner* — Majdi Alsomiri
(74) *Attorney, Agent, or Firm* — Lorenz & Kopf, LLP

(57) ABSTRACT

Methods and systems are provided for controlling an electrical system of a vehicle. Sensors are used to obtain first data for a first path of calculations and second data for a second path of calculations. The first path comprises a first plurality of calculations of generating a value of a parameter pertaining to the electrical system, and the second path comprises a second plurality of calculations of monitoring the electrical system with respect to the first path. A processor is coupled to the plurality of sensors, and is configured to determine whether a data frozen flag is active, perform the first plurality of calculations of the first path using the first data if the first data flag is inactive, and perform the second plurality of calculations of the second path if the first data flag is active.

19 Claims, 5 Drawing Sheets

(56) References Cited

U.S. PATENT DOCUMENTS

| | | | |
|---|---|---|---|
| 6,067,586 A * | 5/2000 | Ziegler et al. | 710/18 |
| 6,351,823 B1 * | 2/2002 | Mayer et al. | 714/10 |
| 6,704,628 B1 * | 3/2004 | Fennel et al. | 701/29 |
| 6,934,874 B2 * | 8/2005 | Retter et al. | 714/4.1 |
| 6,936,991 B2 * | 8/2005 | Chen et al. | 318/700 |
| 7,049,782 B2 * | 5/2006 | Chen et al. | 318/609 |
| 7,138,729 B2 * | 11/2006 | Bailey | 307/45 |
| 7,462,952 B2 * | 12/2008 | Bailey | 307/9.1 |
| 7,687,935 B2 * | 3/2010 | Bailey | 307/9.1 |
| 7,728,541 B2 * | 6/2010 | Subrata et al. | 318/449 |
| 7,759,885 B2 * | 7/2010 | Yamada et al. | 318/400.15 |
| 7,960,930 B2 * | 6/2011 | Sato | 318/432 |
| 2008/0052494 A1 * | 2/2008 | Weiberle et al. | 712/43 |
| 2009/0121544 A1 * | 5/2009 | Bailey | 307/10.1 |
| 2010/0072925 A1 * | 3/2010 | Itoh et al. | 318/400.02 |
| 2011/0202226 A1 * | 8/2011 | Welchko et al. | 701/29 |

\* cited by examiner

METHOD AND SYSTEM FOR CONTROLLING ELECTRICAL SYSTEMS OF VEHICLES

TECHNICAL FIELD

The present invention generally relates to vehicles and, more particularly, relates to a method and system for controlling electrical systems of vehicles.

BACKGROUND OF THE INVENTION

In recent years, advances in technology, as well as ever-evolving tastes in style, have led to substantial changes in the design of automobiles. One of the changes involves the complexity of the electrical and drive systems within automobiles, particularly alternative fuel vehicles, such as hybrid, battery electric, and fuel cell vehicles. Such alternative fuel vehicles typically use one or more electric motors, perhaps in combination with another actuator, to drive the wheels.

Such vehicles typically include a vehicle propulsion system having multiple components that contribute to the propulsion of the vehicle. These components can be further grouped into subsystems, such as the drivetrain, the internal combustion engine, and the hybrid electric drive system. The electric drive system typically includes multiple components including sensors, energy storage, electronic inverters, electric motors, and a control system. To ensure the operating integrity of the electric drive system, a multi-layer monitoring system may be used to ensure that the output of the electric drive (torque, speed, etc.) is as requested, or possibly in the case of a fault situation, as delivered.

A commonly employed first layer monitoring system performs diagnostics on all sensor inputs. Such low level diagnostics may include, but are not limited to, checking whether a sensor is able to communicate or checking to see if a sensor reading is in its expected or allowable operating range. Such sensors may include current sensors, voltage sensors, position sensors, speed sensors, temperature sensors, physical and/or virtual software replacements, and the like.

A second layer monitoring system may perform monitoring on the control system to ensure that it is producing outputs as intended. Such a second layer monitoring system will typically monitor the entire control system from input to output or by monitoring the individual components of the control system separately to determine the integrity of the overall control system. For example, a second layer monitoring system can be used to verify that the correct outputs are produced for the given inputs in order to detect errors in the computational processors, memory, and data storage. A conventional method for checking the duty cycles is to essentially perform an entire redundant calculation. However, such a calculation demands considerable processing power and memory.

Accordingly, it is desirable to provide a method and system for controlling electrical systems of vehicles. Furthermore, other desirable features and characteristics of the present invention will become apparent from the subsequent description taken in conjunction with the accompanying drawings and the foregoing technical field and background.

SUMMARY

In accordance with an exemplary embodiment, a method for controlling an electrical system of a vehicle using first data for a first path of calculations and second data for a second path of calculations is provided. The first path comprises a first plurality of calculations of generating a value of a parameter pertaining to the electrical system, and the second path comprises a second plurality of calculations of monitoring the electrical system with respect to the first path. The method comprises the steps of determining whether the first data is ready for processing along the first path using a processor, performing calculations of the first path using the first data and the processor, and performing calculations of the second path using the processor and the second data if the first data is not ready for processing along the first path.

In accordance with another exemplary embodiment, a method for controlling an electrical system of a vehicle using control data for a control path of a first plurality of calculations of the electrical system and monitoring data for a monitoring path of a second plurality of calculations for monitoring the control path is provided. The method comprises the steps of determining whether a plurality of data frozen flags are active using a processor, each of the plurality of data frozen flags corresponding to a respective one of the first plurality of calculations of the first path and a respective one of the second plurality of calculations of the second path, performing those of the first plurality of calculations for which the corresponding data frozen flag is inactive using the processor, performing those of the second plurality of calculations for which the corresponding data frozen flag is active using the processor, storing results of the second plurality of calculations upon completion of the second plurality of calculations, and setting the data frozen flag to inactive using the processor upon completion of the second plurality of calculations.

In accordance with a further exemplary embodiment, a system for controlling an electrical system of a vehicle is provided. The system comprises a plurality of sensors and a processor. The plurality of sensors are used to obtain first data for a first path of calculations and second data for a second path of calculations. The first path comprises a first plurality of calculations of generating a value of a parameter pertaining to the electrical system, and the second path comprises a second plurality of calculations of monitoring the electrical system with respect to the first path. The processor is coupled to the plurality of sensors, and is configured to determine whether a data frozen flag is active, perform the first plurality of calculations of the first path using the first data if the first data flag is inactive, and perform the second plurality of calculations of the second path if the first data flag is active.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
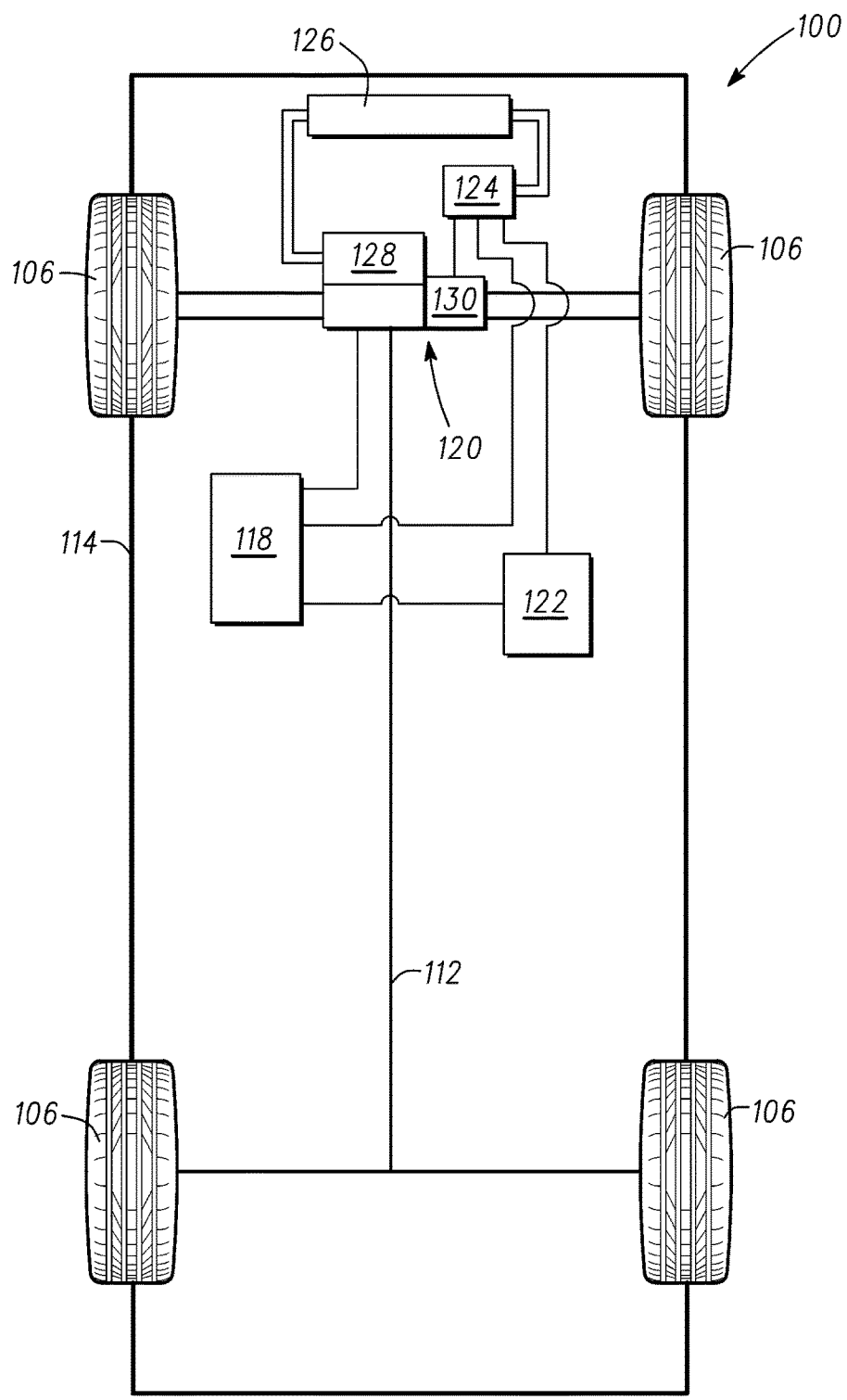
FIG. 1 is a schematic view of an exemplary vehicle, such as an automobile, in accordance with an exemplary embodiment.

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-4 are merely illustrative and may not be drawn to scale.

FIGS. 1-4 illustrate a method and system for controlling an automotive electrical system. The electrical system includes a power electronics unit (e.g., a direct current-to-alternating current (DC/AC) inverter or a direct current-to-direct current (DC/DC) converter) with one or more power switches or transistors. First and second voltage commands corresponding to respective first and second components of a commanded voltage vector on a synchronous frame of reference coordinate system are received. A plurality of duty cycles for operating the at least one switch are calculated based on the first and second voltage commands. First and second actual voltages are calculated based on the plurality of duty cycles. The first and second actual voltages correspond to respective first and second components of an actual voltage vector on the synchronous frame of reference coordinate system. An indication of a fault is generated based on the difference between the first component of the commanded voltage vector and the first component of the actual voltage vector and the difference between the second component of the commanded voltage vector and the second component of the actual voltage vector. The electrical system also preferably produces an electric motor engine torque for the vehicle, and that can be monitored using methods and systems disclosed herein.

FIG. 1 illustrates a vehicle 100, according to one embodiment of the present invention. The vehicle 100 includes a chassis 102, a body 104, four wheels 106, and an electronic control system 108. The body 104 is arranged on the chassis 102 and substantially encloses the other components of the vehicle 100. The body 104 and the chassis 102 may jointly form a frame. The wheels 106 are each rotationally coupled to the chassis 102 near a respective corner of the body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD), or another type of vehicle. The vehicle 100 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the vehicle 100 is an HEV, and further includes an actuator assembly 120, a battery (or a DC power supply) 122, a power converter assembly (e.g., an inverter or inverter assembly) 124, and a radiator 126. The actuator assembly 120 includes a combustion engine 128 and an electric motor/generator (or motor) 130.

Still referring to FIG. 1, the combustion engine 128 and/or the electric motor 130 are integrated such that one or both are mechanically coupled to at least some of the wheels 106 through one or more drive shafts 132. In one embodiment, the vehicle 100 is a "series HEV," in which the combustion engine 128 is not directly coupled to the transmission, but coupled to a generator (not shown), which is used to power the electric motor 130. In another embodiment, the vehicle 100 is a "parallel HEV," in which the combustion engine 128 is directly coupled to the transmission by, for example, having the rotor of the electric motor 130 rotationally coupled to the drive shaft of the combustion engine 128.

The radiator 126 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 128 and the inverter 124.

Referring again to FIG. 1, in the depicted embodiment, the inverter 124 receives and shares coolant with the electric motor 130. However, other embodiments may use separate coolants for the inverter 124 and the electric motor 130. The radiator 126 may be similarly connected to the inverter 124 and/or the electric motor 130.

The electronic control system 118 is in operable communication with the actuator assembly 120, the high voltage battery 122, and the inverter 124. Although not shown in detail, the electronic control system 118 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 2:
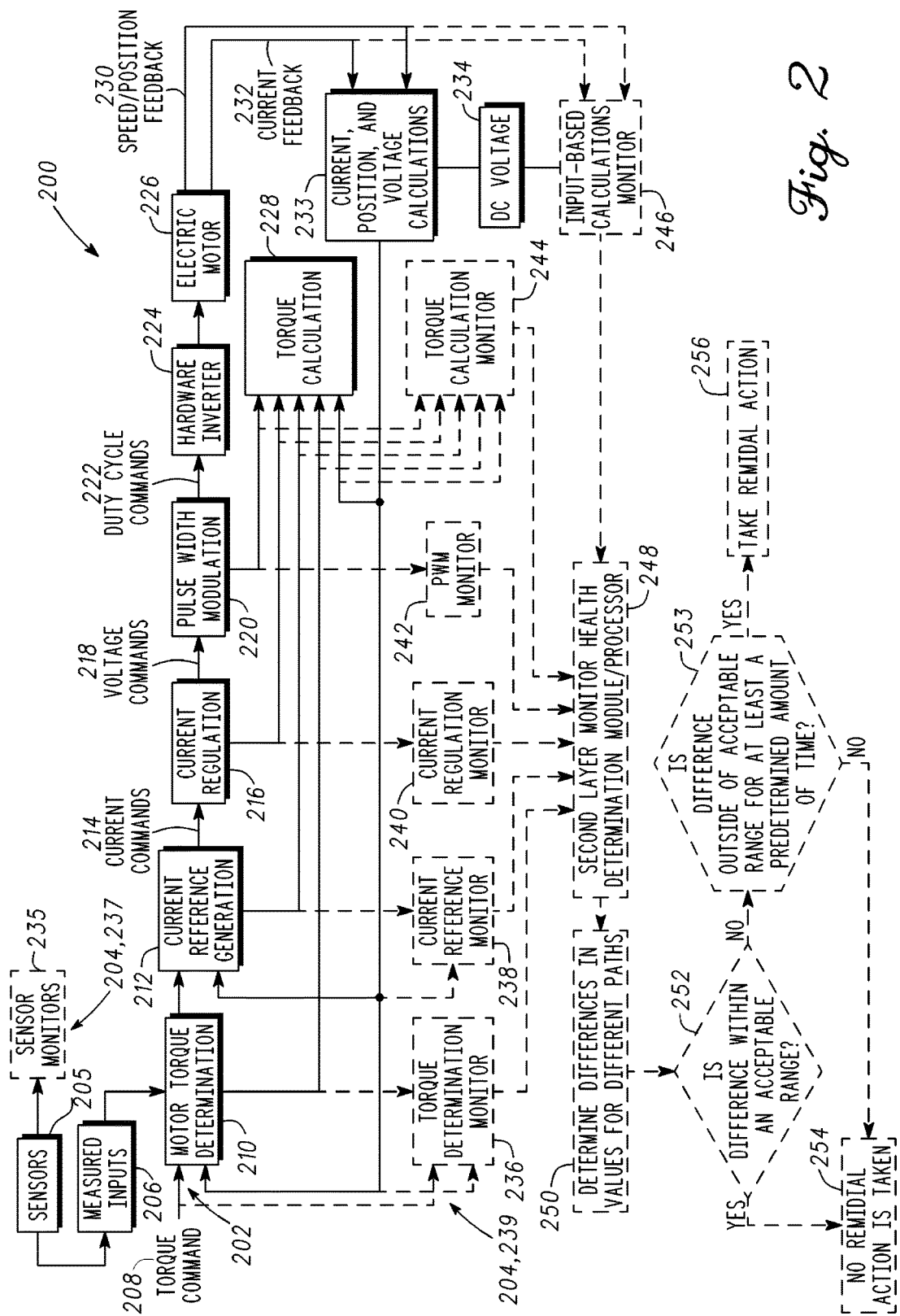
FIG. 2 is a functional block diagram of a motor control system and method for a vehicle, such as the vehicle of FIG. 1, in accordance with an exemplary embodiment.

FIG. 2 is a functional block diagram of a motor control system and method 200 for a vehicle, such as the vehicle 100 of FIG. 1, in accordance with an exemplary embodiment. In one preferred embodiment, the motor control system and method 200 operates in a motor torque controlled system. In another preferred embodiment, the motor control system and method 200 operates in a torque regulated system. In still other embodiments, the motor control system and method 200 may operate in a speed controlled system, among other possible variations.

As depicted in FIG. 2, the motor control system and method 200 consists of multiple operations in a forward (or normal) control path 202 shown in FIG. 2 with solid lines. This preferably includes, but is not limited to: obtaining measured inputs 206 from sensors, performing calculations on the measured inputs 206, receiving a torque command 208, processing the torque command 208, generating a motor torque determination 210 using the measured inputs 206 and the torque command 208, generating a reference current 212 using the motor torque determination 210, converting the torque command 208 to current commands 214 based on present speed and available voltage and the reference current 212, and providing current regulation 216 using the current commands 214. The output of the current regulator performing the current regulation 216 includes the voltage commands 218 for the output voltage needed to produce the requested currents pursuant to the current commands 218.

A pulse width modulation (PWM) system is used for pulse width modulation 220 by generating the necessary gate pulses or duty cycle commands 222, which are sent to the inverter hardware 224 stage to control an electric motor 226 to the desired speed and/or torque as calculated in the calculation block 228. The torque values (and/or other parameter values) for the electric motor 226 are preferably calculated in the calculation block 228 using the inputs from the motor torque determination 210, the reference current 212 generation, the current regulation 216, and the pulse width modulation 220.

In addition, speed and/or position feedback 230, current feedback 232, and DC voltage 234 values are also preferably used in performing current, position, and voltage calculations 233. The results of the position feedback 230, current feedback 232, and DC voltage 234 values are provided for use in subsequent iterations of the motor torque determination 210, preferably also along with updated values of the measured inputs 206 and the torque command 208. Additional considerations may also be employed by the forward control path 202 such as, by way of example only, system temperatures, system limitations, and additional communications and/or or other feedbacks to the overall system control in terms of operating status and availability.

The forward control path 202 may also use any and all available information and/or variables to produce and indicate an estimate of the operating output, such as the electric motor torque as calculated in the calculation block 228. In FIG. 2, this is shown as a torque calculation consisting of estimating the torque being produced by the electric motor in the calculation block 228. However, as described above, in other embodiments, vehicle speed and/or other parameter values may be calculated, instead of or in addition to the electric motor torque.

The control system and method 200 also include a monitoring flow path 204 (also referenced herein as the monitoring path 204), depicted in dashed lines in FIG. 2. In the depicted embodiment, the monitoring path 204 includes two layers of monitoring, namely a first layer 237 and a second layer 239.

In an exemplary embodiment, the first layer 237 of monitoring includes the use of sensor monitors 235 for the individual sensors 205 providing the measured inputs 206. For example, such sensor monitors 235 may be used to monitor whether the sensors 205 are turned on, and/or whether the sensors 205 are producing the measured inputs 206 within acceptable ranges of values.

The second layer 239 of monitoring in the control system and method 200 preferably processes all inputs and performs all calculations independently, utilizing separate memory and data storage areas. The distributed second layer 239 monitoring system performs an independent calculation of the forward control path 202 and performs rationalization with the results of the forward control path 202 to verify that both the forward control path 202 and monitoring path 204 calculations are within a specified tolerance of one another.

The second layer 239 distributed monitor breaks the forward control path into small function blocks. The second layer 239 distributed monitor then performs a monitoring function on each of the small functional blocks independently. The small functional blocks are subsequently combined to form a complete loop of the control system.

In a preferred embodiment, the second layer 239 comprises monitoring of all intermediate and final calculations of the control system and method 200 as separate functional blocks independent of one another for monitoring purposes. Specifically, in the depicted embodiment, the second layer 239 includes a torque determination monitor 236, a current reference monitor 238, a current regulation monitor 240, a pulse width modulation monitor 242, a torque calculation monitor 244, and an input-based calculations monitor 246.

The torque determination monitor 236 provides monitoring of the motor torque determination 210. In one preferred embodiment, the motor torque determination 210 uses a first set of data from the measured inputs 206 in determining the motor torque, and the torque determination monitor 236 uses a redundant or second set of data from the measured inputs 206 in providing redundant calculations of the motor torque for comparison with the motor torque determination 210. In another preferred embodiment, the torque determination monitor 236 provides backwards calculations using the results of the motor torque determination 210 for comparisons with the input data from the measured inputs 206 that was used in the motor torque determination 210. In yet another preferred embodiment, the torque determination monitor 236 provides redundant calculations of some or all of the calculations of the motor torque determination 210, and/or performs such calculations in a different reference frame and/or during a different time period.

The current reference monitor 238 provides monitoring of the reference current 212 generation. In one preferred embodiment, the reference current 212 generation uses a first set of data from the measured inputs 206 in determining the reference current, and the current reference monitor 238 uses a redundant or second set of data from the measured inputs 206 in providing redundant calculations of the reference current for comparison with the reference current 212 generation. In another preferred embodiment, the current reference monitor 238 provides backwards calculations using the results of the reference current 212 generation for comparisons with the input data from the measured inputs 206 that was used in the reference current 212 generation. In yet another preferred embodiment, the current reference monitor 238 provides redundant calculations of some or all of the calculations of the reference current 212 generation, and/or performs such calculations in a different reference frame and/or during a different time period.

The current regulation monitor 240 provides monitoring of the current regulation 216. In one preferred embodiment, the current regulation 216 uses a first set of data from the measured inputs 206 in determining the regulated current, and the current regulation monitor 240 uses a redundant or second set of data from the measured inputs 206 in providing redundant calculations of the regulated current for comparison with the current regulation 216. In another preferred embodiment, the current regulation monitor 240 provides backwards calculations using the results of the current regulation 216 for comparisons with the input data from the measured inputs 206 that was used in the current regulation 216. In yet another preferred embodiment, the current regulation monitor 240 provides redundant calculations of some or all of the calculations of the current regulation 216, and/or performs such calculations in a different reference frame and/or during a different time period.

The pulse width modulation monitor 242 provides monitoring of the pulse width modulation 220. In one preferred embodiment, the pulse width modulation 220 uses a first set of data from the measured inputs 206 in determining the pulse width modulation, and the pulse width modulation monitor 242 uses a redundant or second set of data from the measured inputs 206 in providing redundant calculations of the pulse width modulation for comparison with the pulse width modulation 220. In another preferred embodiment, the pulse width modulation monitor 242 provides backwards calculations using the results of the pulse width modulation 220 for comparisons with the input data from the measured inputs 206 that was used in the pulse width modulation 220. In yet another preferred embodiment, the pulse width modulation monitor 242 provides redundant calculations of some or all of the calculations of the pulse width modulation 220, and/or performs such calculations in a different reference from and/or during a different time period.

The torque calculation monitor 244 provides monitoring of the torque calculation block 228 (and/or any other calculations of the calculation block 228 of FIG. 2). In one preferred embodiment, the torque calculation block 228 uses a first set of data from the measured inputs 206 in determining the torque calculation, and the torque calculation monitor 244 uses a redundant or second set of data from the measured inputs 206 in providing redundant calculations of the torque calculation (and/or any other calculations of the calculation block 228) for comparison with the torque calculation block 228. In another preferred embodiment, the torque calculation monitor 244 provides backwards calculations using the results of the torque calculation block 228 (and/or any other calculations of the calculation block 228) for comparisons with the input data from the measured inputs 206 that was used in the torque calculation block 228. In yet another preferred embodiment, the torque calculation monitor 244 provides redundant calculations of some or all of the calculations of the torque calculation block 228 (and/or any other calculations of the calculation block 228), and/or performs such calculations in a different reference from and/or during a different time period.

The input-based calculations monitor 246 provides monitoring of the measured inputs 206 and/or the current, position, and voltage calculations 233. In one preferred embodiment, the current, position, and voltage calculations 233 uses a first set of data from the measured inputs 206 in determining the current, position, and voltage values, and the input-based calculations monitor 246 uses a redundant or second set of data from the measured inputs 206 in providing redundant calculations of the current, position, and voltage calculations 233 for comparison with the current, position, and voltage calculations 233. In another preferred embodiment, the input-based calculations monitor 246 provides backwards calculations using the results of current, position, and voltage calculations 233 for comparisons with the input data that was used in the torque calculation block 228. In yet another preferred embodiment, the input-based calculations monitor 246 provides redundant calculations of some or all of the calculations of the current, position, and voltage calculations 233, and/or performs such calculations in a different reference from and/or during a different time period. In addition, in a preferred embodiment, the input-based calculations monitor 246 also monitors the measured inputs 206 over time.

The results of the calculations of the torque determination monitor 236, the current reference monitor 238, the current regulation monitor 240, the pulse width modulation monitor 242, the torque calculation monitor 244, and the input-based calculations monitor 246 are provided to a second layer monitor health determination module 248 for processing. The second layer monitor health determination module 248 includes a processor that compares the values from the various second layer 239 monitoring path 204 modules (e.g., the torque determination monitor 236, the current reference monitor 238, the current regulation monitor 240, the pulse width modulation monitor 242, the torque calculation monitor 244, and the input-based calculations monitor 246 are provided to a second layer monitor health determination module 248) with corresponding values from corresponding modules of the forward control path 202 (e.g., the motor torque determination 210, the reference current 212 generation, the current regulation 216, the pulse width modulation 220, the torque calculation block 228, and the current, position, and voltage calculations 233, respectively).

Specifically, in the depicted embodiment, the processor of the second layer monitor health determination module 248 calculates differences 250 between the values from the various second layer 239 monitoring path 204 modules and the corresponding values from the corresponding modules of the forward control path, and determines whether these calculated differences 250 are within acceptable ranges (step 252). If the differences are within acceptable tolerance ranges, then no remedial action is required (step 254). Conversely, if one or more of the differences are not within acceptable tolerance ranges, then remedial action is taken (step 256). Such remedial action may include, by way of example only, performing redundant calculations, providing warnings to users and/or operators of the control system and method 200, shutting down part or all of the control system and method 200, and/or other remedial measures. In addition, in certain embodiments, the determination in step 252 also includes a determination of whether the difference is beyond an acceptable tolerance range for at least a predetermined length of time, and the remedial action (step 256) is taken only if the difference is beyond an acceptable tolerance range for at least the predetermined length of time.

In one preferred embodiment, the second layer 239 processes all inputs and perform all calculations independently, utilizing separate memory and data storage areas. Then, the two calculations are compared to help ensure that they are identical and thus, that the calculations can be considered to be correct, or secured. However, this would duplicate the required computing power and memory required, which may not always be feasible.

Alternatively, the independent calculations of the second layer 239 may comprise functionally equivalent calculations or some form of backward calculations with the objective of verifying that the correct output of the module has been produced for the given inputs. In this case, the forward control path 202 and the monitoring path 204 calculations would need to be within a specified tolerance of one another in order to be considered verified or secured.

In certain cases, it may be difficult to simplify the calculations to allow for a redundant, but functionally equivalent, calculation, within the processor throughput and memory constraints. Accordingly, in a preferred embodiment, the monitoring path 204 is run at a slower rate than the normal or forward control path 202, so that any errors or failures may still be detected.

Employing a multi-rate strategy is particularly effective when the subsystem being monitored is executed very quickly when compared to the physical characteristics of the system. For example, executing the motor control functions every 50-100 microseconds when the torque response of the motor is on the order of 20-50 milliseconds would allow for failure detection prior to an undesirable system output change. Additional details of such a multi-rate strategy are provided in FIGS. 3-5 and are described in greater detail below in connection therewith.

Figure 3:
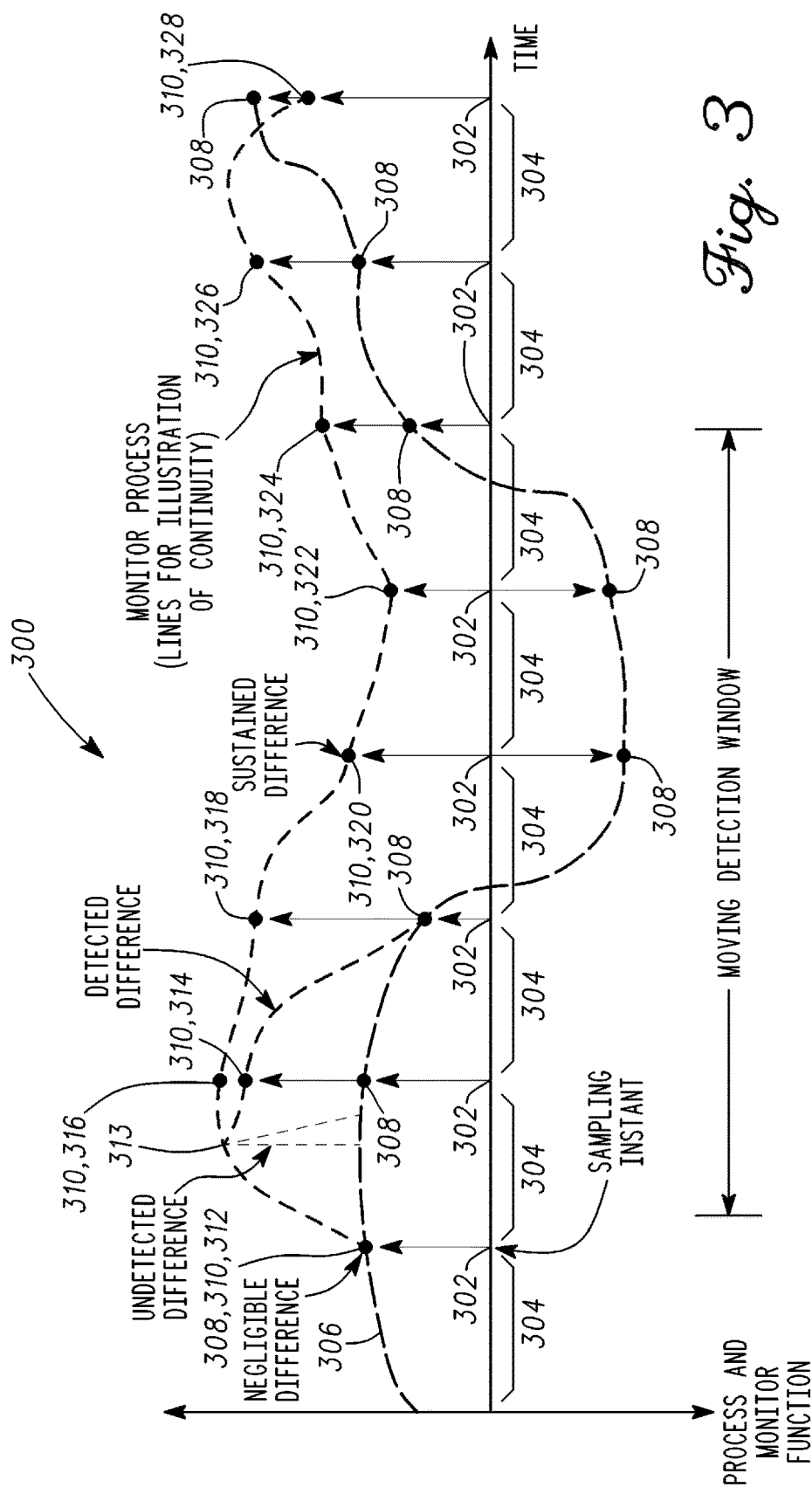
FIG. 3 is a graph of an exemplary sampling of data from an electronic control system over time, and that can be used in connection with the vehicle of FIG. 1 and the motor control system and method of FIG. 2, in accordance with an exemplary embodiment.

FIG. 3 is a graph of an exemplary sampling 300 of data from an electronic control system over time, and that can be used in connection with the vehicle 100 of FIG. 1 and the motor control system and method 200 of FIG. 2, in accordance with an exemplary embodiment. As depicted in FIG. 3, various sampling data is obtained over a number of sampling instances 302, and monitoring calculations are performed over moving detection windows 304 corresponding to the sampling instances using the sampling data obtained from respective sampling instances 302.

In the depicted embodiment, control path calculation results 306 are represented by the relatively small dots of FIG. 3. In a preferred embodiment, the fastest control cycle corresponds to the forward control path 202 of the control system and method 200 of FIG. 2. In one exemplary embodiment, the control path calculations and corresponding control path calculation results 306 of the fastest control cycle are performed 100 microseconds apart. However, the timing of the control path calculations and corresponding results 306 of the fastest control cycle may vary in other embodiments.

Also in the depicted embodiment, sampled monitor path calculation results 308, 310 are represented by the relatively large dots of FIG. 3. Specifically, as depicted in FIG. 3, the large dots connected by the smaller dots of FIG. 3 represent forward control path calculation results 308 taken at the sampling instances 302 of FIG. 3, and preferably corresponding to the forward control path 202 of FIG. 2. Conversely, the large dots connected by dashed lines in FIG. 3 represent redundant or monitoring path calculation results 310 (preferably corresponding to the monitoring path 204 of FIG. 2) calculated over the moving detection windows 304 using data from the sampling instances 302.

For illustrative purposes, the monitoring path calculation results 310 are labeled in FIG. 3 as an exemplary first monitoring path calculation result 312, second monitoring path calculation result 314, third monitoring path calculation result 316, fourth monitoring path calculation result 318, fifth monitoring path calculation result 320, sixth monitoring path calculation result 322, seventh monitoring path calculation result 324, eighth monitoring path calculation result 326, and ninth monitoring path calculation result 328, each representing different sampling instances 302 and corresponding sampling data from moving detection windows 304, as referenced below. The dashed line connecting the monitoring path calculation results 310 is provided for illustration purposes only in order to indicate the continuity of the monitoring function.

The monitoring path calculations that generate the monitoring path calculation results 310 are conducted periodically, and less frequently than the forward control path calculations that generate the forward control path calculation results 308. In one exemplary embodiment, while the forward control path calculations that generate the forward control path calculation results 308 are conducted every 100 microseconds, the monitoring path calculations that generate the monitoring path calculation results 310 are conducted every five milliseconds, with each five milliseconds comprising one moving detection window 304. However, in other embodiments, the moving detection windows 304 may be of a different duration of time, among other possible variations. For example, in another exemplary embodiment for automotive hybrid systems, an interval or detection window of 200 microseconds may be utilized. By performing the monitoring path calculations that generate the monitoring path calculation results 310 periodically, any corruption can be detected in the interval or moving detection window 304 of interest to prevent an undesirable system response.

Four exemplary cases of interest are highlighted in the figure for the sampled monitor system. The first case, referring to the first monitoring path calculation result 312, shows that the monitoring function calculations produce a result which is of negligible difference to the process being monitored, or is within the allowable difference between the calculations. For cases such as this, the process continues, and no remedial action is necessary.

The second case, referring to an intermediate instance in time 313 during which a redundant or monitoring calculation result is not obtained, shows a case in which the monitoring function does not detect the deviation in the intended process, for the reason that no sampling occurs during the deviation. For cases such as this, any proactive fault response might occur from the primary monitoring function if such condition is beyond a predetermined threshold fault level. Otherwise, the process continues, and no remedial action is necessary.

The third case, referring to the second monitoring path calculation result 314, shows that the monitoring function identifies a different result than the primary calculation path, but the condition exists for only a short time (one sample in the presented figure) and does not exceed a level of concern. For cases such as this, the process continues, and no remedial action is necessary.

The fourth case, referring to the third monitoring path calculation result 316, the fourth monitoring path calculation result 318, the fifth monitoring path calculation result 320, the sixth monitoring path calculation result 322, the seventh monitoring path calculation result 324, the eighth monitoring path result 326, and the ninth monitoring path calculation result 328, indicates that a sustained difference exists between the primary and monitoring path calculations. For cases such as this, the process may be stopped in whole or in part, additional redundant calculations may be performed, notifications of a possible error or fault may be provided, and/or other remedial action may be performed.

Specifically, in one exemplary embodiment, a difference between a respective monitoring path calculation result 310 and a corresponding forward control path calculation result 308 is calculated using a processor, and is used as the quantity of interest for monitoring purposes and for remedial action. If the difference exceeds a pre-determined threshold in amplitude and/or duration within the moving detection window, the monitoring function would indicate the condition to the system controller.

In one exemplary embodiment, the detection of any difference of significance (e.g. a difference between a respective monitoring path calculation result 310 and a corresponding forward control path calculation result 308) is of relatively higher importance. Also in an exemplary embodiment, once such a difference of significance is detected, it is of lesser importance as to which path (if any) is producing the correct calculations. In an exemplary embodiment, the forward control path calculation results 308 cannot be relied upon since they are dissimilar.

In addition, in one exemplary embodiment, the monitoring function may indicate that a difference is significant if the monitoring path calculation results 310 differ from the corresponding forward control path calculation results 308 for some percentage of the time in one or more moving detection windows 304. Also in an exemplary embodiment, the monitoring function may indicate that a difference is significant if the monitoring path calculation results 310 differ from the corresponding forward control path calculation results 308 for a predetermined length of time. The criteria (e.g., the magnitude of the threshold difference require and/or the threshold amount of time or percentage of time required to indicate an error or a failure) utilized for determining whether the difference is significant (i.e., in determining whether there is an error or a failure) may be dependent upon the process being monitored.

One important requirement of the sampled monitor system is that of synchronization. Because the monitor is performing redundant (or functionally equivalent) calculations utilizing separate memory locations and comparing the results with the forward control path, it is necessary that the data used for the calculations and comparisons are coordinated in the appropriate time frame.

Consider the time frame of running the sampled monitor. If the fastest control cycle (TaskZero) (i.e., for the forward control path 202 of FIG. 2) is 100 microseconds while the sampled monitor (i.e., for the monitoring flow path 204 of FIG. 2) is run at five milliseconds (TaskFive), the sampled monitor calculations will take place in a distributed fashion over a portion of, or the entire five millisecond task rate. As a result, the TaskZero control calculations will occur fifty times more frequently than the monitoring function calculations. If the monitor processes the inputs of the given TaskZero variables and compares the results of the calculations to those corresponding to a subsequent TaskZero interval, the monitor may incorrectly indicate a discrepancy resulting in a false fail condition.

Also in an exemplary embodiment, the monitor calculations for the monitoring flow path 204 of FIG. 2 are necessary to be distributed over the TaskFive interval instead of being performed within the like TaskZero period. For example, if the calculations were performed in the same TaskZero interval, the monitor could severely load the processing systems up to the point that the required calculations cannot be completed within the required time frame.

Figure 4:
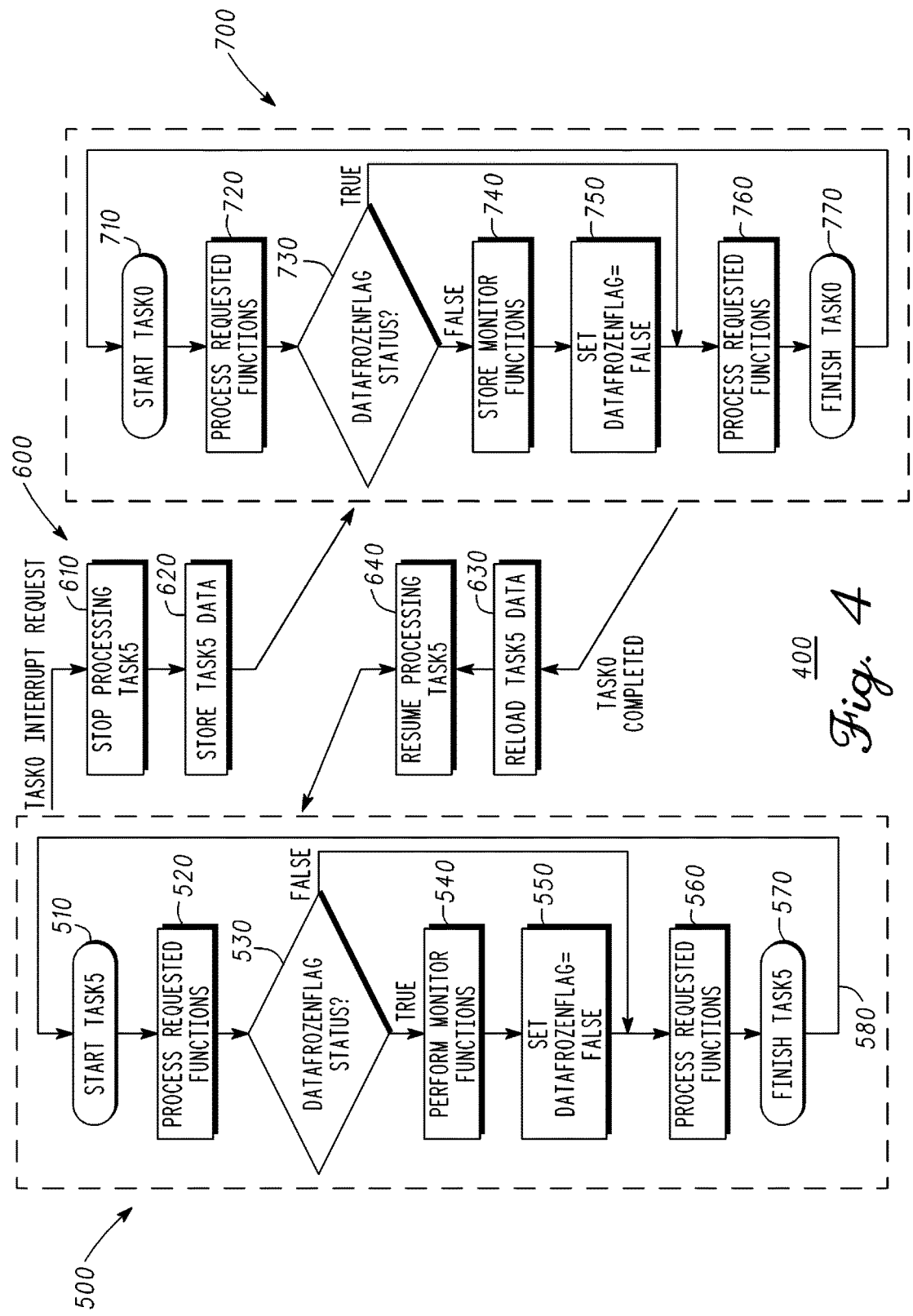
FIG. 4 is a flowchart of a process for controlling electrical systems of vehicles, and that can be used in connection with the vehicle of FIG. 1 and the motor control system and method of FIG. 2 and in implementing the data sampling of FIG. 3, in accordance with an exemplary embodiment.

FIG. 4 is a flowchart of a process 400 for monitoring electronic motor controllers for a vehicle, and that can be used in connection with the vehicle 100 of FIG. 1 and the motor control system and method 200 of FIG. 2 and in implementing the data sampling 300 of FIG. 3, in accordance with an exemplary embodiment. In the depicted embodiment, the process 400 includes the synchronization of data in the sampled monitor system, such as the sampling 300 of data of FIG. 3 for the control system and method 200 of FIG. 2.

In a preferred embodiment, the process 400 is conducted separately by each functional block of the second layer 239 of the monitoring path 204 of FIG. 2 in concert with a corresponding functional block of the forward control path 202 of FIG. 2. Specifically, in a preferred embodiment, the process 400 is conducted separately by (i) the torque determination monitor 236 of FIG. 2 in concert with the motor torque determination 210 of FIG. 2; (ii) the current reference monitor 238 in concert with the reference current 212 generation of FIG. 2; (iii) the current regulation monitor 240 in concert with the current regulation 216 of FIG. 2; (iv) the pulse width modulation monitor 242 in concert with the pulse width modulation 220 of FIG. 2; (v) the torque calculation monitor 244 in concert with the torque calculation block 228 of FIG. 2; (vi) the input-based calculations monitor 246 of FIG. 2 in concert with the current, position, and voltage calculations 233 of FIG. 2, and any other functional blocks of the second layer 239 of the monitoring path 204 in concert with their corresponding functional blocks of the forward control path 202 of FIG. 2.

FIG. 4 refers to three portions, components, or sub-processes of the process 400. A first component 500 comprises a TaskFive processor interval sub-process 500, and preferably corresponds to a relatively slower, monitoring processing path (most preferably the monitoring path 204 of FIG. 2). A second component 600 comprise a task rate transition sub-process 600, and preferably corresponds to a transition between the relatively slower, monitoring processing path (most preferably the monitoring path 204 of FIG. 2) and a relatively faster, control processing path (most preferably the forward control path 202 of FIG. 2). A third component 700 comprises a TaskZero rate interval sub-process 700, and preferably corresponds to the relatively faster, control processing path (most preferably the forward control path 202 of FIG. 2). Preferably the various steps of the process 400 of FIG. 4 are performed by a processor of the second layer monitor health determination module 248 of FIG. 2 using data and measured inputs 206 from the sensors 205 of FIG. 2.

For illustrative purposes, only two task rates are depicted in FIG. 4. Alternative embodiments may employ additional task rates involving similar methods of synchronization between the task rate(s). The process begins at step 510, in which the TaskFive rate calculations begin. The process continues processing requested functions at step 520.

Then, at step 530, the process decides if the respective monitoring functions should be executed. Specifically, during step 530, the process evaluates the status of the DataFrozenFlag. In a preferred embodiment, the DataFrozenFlag is True (or, the DataFrozenFlag is in an active state) if the control system and method 200 of FIG. 2 and/or first data thereof is ready for processing by the respective functional block of the forward control path 202 of FIG. 2. In one exemplary embodiment, this occurs at periodic points in time corresponding to the control path calculation results 306 of FIG. 3.

If the DataFrozenFlag status is determined to be False in step 530, then the process continues to process the forward control path functions at step 560. In a preferred embodiment, during step 560, the calculations of the respective functional block of the forward control path 202 of FIG. 1 are performed.

Conversely, if the status of the DataFrozenFlag is determined to be True in step 530, then the process proceeds instead to step 540, in which the monitor module is evaluated. In a preferred embodiment, during step 540, the monitor module functions are performed, and the process then continues to step 550, described below. Specifically, in one preferred embodiment, during step 540, the calculations of the respective functional block of the monitoring path 204 of FIG. 1 are performed, and the process then continues to step 550, described below.

During step 550, the status of the DataFrozenFlag is changed to False. The process then continues to step 560, in which additional functions of the forward control path are processed. Specifically, in one exemplary embodiment, additional calculations of the respective functional block of the forward control path 202 of FIG. 1 are performed during step 560. Alternatively, in another exemplary embodiment, calculations of a different functional block of the forward control path 202 of FIG. 1 may be performed during step 560.

The process then continues to step 570. During step 570, the TaskFive tasks are completed. Specifically, in one exemplary embodiment, the calculations of the respective functional block of the forward control path 202 of FIG. 1 are completed during step 570. In the exemplary embodiment with only two task rates, the process cycles back to the beginning, shown as step 580 returning to step 510, and the process repeats.

In this example with two task rates, the TaskFive rate is the supervisory process. In practice, the slower task rates may not be integer multiples of the fastest control cycle. Because the fastest control cycle sets multiple system properties, consumes the most processing resources, and it typically highly dependent upon consistent timing, the fastest control cycle (preferably, the forward control path 202 of FIG. 2) takes priority over computation of slower control cycles (preferably, the monitoring path 204 of FIG. 2).

As a result, the fastest control cycle (preferably, the forward control path 202 of FIG. 2) is executed on a consistent basis while the slower control cycles (preferably, the monitoring path 204 of FIG. 2) are distributed over the remaining processor execution time. In terms of this example, the TaskZero control cycle (preferably, the forward control path 202 of FIG. 2) may begin, on a priority basis, at any instant during the TaskFive control cycle (preferably, the monitoring path 204 of FIG. 2). Therefore, at any point during the TaskFive control cycle (i.e., during the calculations of the monitoring path 204 of FIG. 2, in a preferred embodiment), if a request to run the TaskZero control cycle (i.e., the forward control path 202 of FIG. 2, in a preferred embodiment) is present, the process jumps from its present location in the sub-process 500 to that of the transition sub-process 600.

At step 610, the processing of TaskFive control cycle (i.e., the calculation of the monitoring path 204 of FIG. 2, in a preferred embodiment) ceases, and all variables of necessary intermediate data are stored for future use at step 620. The process then continues to the sub-process 700, which then executes the TaskZero process (i.e., the calculations of the forward control path 202 of FIG. 2, in a preferred embodiment).

The TaskZero process (i.e., the calculations of the forward control path 202 of FIG. 2, in a preferred embodiment) begins at step 710, and continues to process the requested functions of the TaskZero process at step 720. Next, during step 730, a decision is made as to whether monitoring path data and/or variables need to be stored for the monitor modules. This is determined by the status of the DataFrozenFlag, described above, in a preferred embodiment. As discussed above, in one preferred embodiment, the DataFrozenFlag is deemed to be True, or to be in an active state, if control data is ready to be processed by the forward control loop 202 of FIG. 2, such as the case in periodic intervals of FIG. 3.

If it is determined in step 730 that the DataFrozenFlag is set to True, then no additional data needs to be saved for the monitor in the present control cycle. Accordingly, the process continues directly to step 760, described further below.

Conversely, if the DataFrozenFlag is set to False, then data and/or variables need to be stored for use by the monitor module (i.e. the monitoring path 204 of FIG. 2, in one preferred embodiment). Accordingly, the process continues to step 740, in which the data and/or variables required by the monitoring function (i.e., for the calculations of the monitoring path 204 of FIG. 2, in a preferred embodiment) are stored in a memory for subsequent use by the monitoring function (i.e., for use by the monitoring path 204 of FIG. 2, in one preferred embodiment). Following step 740, the process continues to step 750. During step 750, the status of the DataFrozenFlag is set to True, indicating that a data storage event has occurred. The process then continues to step 760, described directly below.

During step 760, additional functions of the process are conducted. In one preferred embodiment, additional calculations of the respective functional block of the forward control path 202 of FIG. 2 are conducted during step 760. Alternatively, in another exemplary embodiment, calculations of one or more additional functional blocks of the forward control path 202 of FIG. 2 may be conducted.

The process continues to step 770 and concludes the execution of the TaskZero process. Once the TaskZero calculations of the sub-process 700 (i.e., the calculations of the respective functional block of the forward control path 202 of FIG. 2, in a preferred embodiment) is concluded, the process jumps back to the transition portion of the sub-process 600. At step 630, the data and variables from the paused and interrupted TaskFive system (i.e., from the monitoring path 204 of FIG. 2, in one exemplary embodiment) are restored to active memory. The process then preferably continues to step 640, in which the process resumes performance of the calculations of the TaskFive system of the sub-process 500 (i.e., of the monitoring path 204 of FIG. 2, in a preferred embodiment).

As depicted in FIG. 4, the setting of the DataFrozenFlag to True by TaskZero and the resetting of the DataFrozenFlag to False after the completion of the monitoring function module in TaskFive allows for a single synchronized set of data to be used by the monitor module. In a preferred embodiment, the re-setting of the DataFrozenFlag in TaskFive occurs after the completion of the monitor module functions so the data integrity of the data being processed by the monitor module is preserved in the result of a request for the process to jump and process the TaskZero system. In one preferred embodiment, the data stored utilizing the DataFrozenFlag comprises any information needed by the monitoring path. This may include system or variable inputs and outputs. Integrator and/or derivative states of any regulators may also be needed in order to process a redundant calculation.

Figure 5:
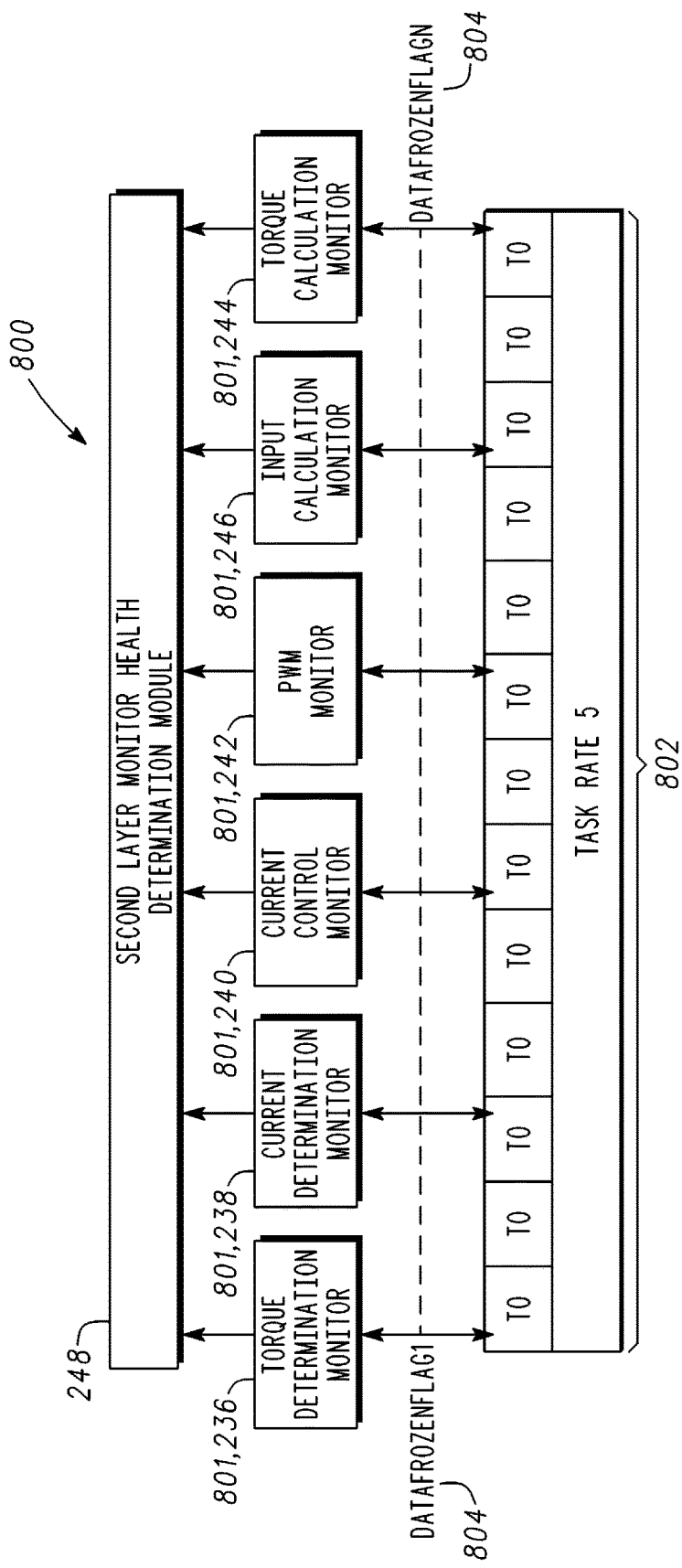
FIG. 5 is a functional block diagram of a hierarchy for the process of FIG. 4, and that can be used in connection with the vehicle of FIG. 1, the motor control system and method of FIG. 2 and the implementation of the data sampling of FIG. 3, in accordance with an exemplary embodiment.

FIG. 5 is a functional block diagram of a hierarchy 800 for the process 400 of FIG. 4, and that can be used in connection with the vehicle 100 of FIG. 1, the motor control system and method 200 of FIG. 2 and the implementation of the data sampling 300 of FIG. 3, in accordance with an exemplary embodiment.

As depicted in FIG. 5, the hierarchy 800 includes various monitoring functions 801 and various corresponding control functions 802, along with the second layer monitor health determination module 248 of FIG. 2. In a preferred embodiment, the monitoring functions 801 correspond to the various functional blocks of the second layer 239 of the monitoring path 204 of FIG. 2, including the torque determination monitor 236 of FIG. 2, the current reference monitor 238 of FIG. 2 (also referenced in FIG. 4 as a current determination monitor), the current regulation monitor 240 of FIG. 2 (also referenced in FIG. 5 as a current control monitor), the pulse width modulation monitor 242 of FIG. 2, the input-based calculations monitor 246 of FIG. 2, and the torque calculation monitor 244 of FIG. 2.

Each of the monitoring functions 801 is coupled to a respective one or more of the corresponding control functions 802. The control functions 802 preferably correspond to the functional blocks of the forward control path 202 of FIG. 2, including the motor torque determination 210, the reference current 212 generation, the current regulation 216, the pulse width modulation 220, the torque calculation block 228, and the current, position, and voltage calculations 233. Also as depicted in FIG. 5, the hierarchy 800 may also include any other monitoring functions 801 (preferably corresponding to any other functional blocks of the second layer 239 of the monitoring path 204 of FIG. 2), along with corresponding control functions 802 (preferably corresponding to any other functional blocks of the forward control path 202 of FIG. 2).

In the depicted embodiment of FIG. 5, each of the monitoring functions 801 (or functional blocks of the second layer 239 of the monitoring path 204 of FIG. 2) are associated with a particular control function 802 (or functional block of the forward control path 202 of FIG. 2), and are independent of one another. In order to determine the security of the overall control system and method 200 of FIG. 2, the validity determination of each of the monitoring functions 801 is communicated to the second layer monitor health determination module 248 as illustrated in FIG. 5.

The second layer monitor health determination module 248 (preferably, a processor thereof) processes the inputs from the plurality of monitoring functions 801 to determine whether the control system or method 200 of FIG. 2, as a whole, is functioning as intended. In one preferred embodiment, the second layer monitor health determination module 248 indicates a fault condition if one or more of the monitoring functions 801 has indicated a non-secure output. For the exemplary application to the hybrid electric vehicle motor torque monitor, the monitoring path 204 monitors all aspects of the system torque production of the control system and method 200. As a result, the system motor forward torque control path 202 of FIG. 2 utilized in the electric motor torque generation is then secured by the monitoring flow path 204 of FIG. 2.

In the depicted embodiment, the monitoring functions 801 include multiple control functions which can be partitioned into individual modules. The processing of and order in which the modules are run are predetermined by the hierarchy of the overall motor control system and method 200 of FIG. 2. For purposes of the sampled monitor system, each control module or functional block of the forward control path 202 of FIG. 2 has its own monitoring function or functional block of the monitoring path 204 of FIG. 4 for the hierarchy 800 of FIG. 5. Each pair of control module and monitoring function is preferably linked by separate DataFrozenFlags 804, as shown as DataFrozenFlag1 804 through DataFrozenFlagN 804 in FIG. 5.

The use of separate DataFrozenFlags 804 provides an important benefit to the sampled monitor system by effectively increasing the resolution of the sampled system. Due to the distributed processing of the calculations at the TaskFive data rate, the various monitoring functions will be sampling the forward control modules at different TaskZero time periods. Hence, any fault which would be able to propagate through the various control modules will have an increased detection opportunity compared to using a single DataFrozenFlag for all of the control modules.

In order to determine the security of the overall motor controls system, the validity determination of each of the monitoring functions 801 is communicated to the second layer monitor health determination module 248. The second layer monitor health determination module 248 processes the inputs from the various monitoring functions 801 in order to confirm whether the control system and method 200 of FIG. 2 are functioning as intended.

If the second layer monitor health determination module 248 determines that the control system is functioning properly, the control output and monitoring process continue uninterrupted. Conversely, if the second layer monitor health determination module 248 determines that the control system is not functioning properly, it takes the appropriate remedial action to prevent an undesired fault response. The remedial action may include one or more of the following, among other possible remedial action: system shutdown, system restart, communicating and indicating the fault detection, fault type and origin, and resulting fault action, or returning the controller to a default operating state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an electrical system of a vehicle using first data for a first path of calculations and second data for a second path of calculations, the first path comprising a first plurality of calculations of generating a value of a parameter pertaining to the electrical system, the second path comprising a second plurality of calculations of monitoring the electrical system with respect to the first path, and the method comprising the steps of:
  determining whether the first data is ready for processing along the first path using a processor;
  performing calculations of the first path using the first data and the processor;
  performing calculations of the second path using the processor and the second data if the first data is not ready for processing along the first path,
  wherein:

the step of performing calculations of the first path comprises performing the calculations of the first path via time sampling at a first rate via the processor; and the step of performing calculations of the second path comprises performing calculations of the second path via time sampling at a second rate via the processor, the second rate being different from the first rate.

2. The method of claim 1, wherein the step of performing the calculations of the second path comprises the step of performing redundant calculations of the first plurality of calculations using the second data and the processor to thereby generate a redundant value of the parameter.

3. The method of claim 1, wherein the step of performing the calculations of the second path comprises the step of performing a backward calculation from the value of the parameter to generate a derived input value using the processor.

4. The method of claim 1, wherein the step of performing calculations of the first path comprises the step of processing a plurality of requested functions for use in determining the value of the parameter using the processor if the data is ready for processing along the control path.

5. The method of claim 1, wherein the step of determining whether the data is ready for processing along the first path comprises the step of determining whether a data frozen flag is active using the processor.

6. The method of claim 5, wherein the step of performing the calculations of the second path comprises the steps of:
performing the calculations of the second path using the processor and the second data so long as the data frozen flag is active; and
setting the data frozen flag to inactive if the first data becomes ready for processing at any time during the performing of the calculations of the second path.

7. The method of claim 6, wherein the step of performing the calculations of the second path comprises the steps of:
storing results of the calculations of the second path using the processor upon completion of the calculations of the second path; and
setting the data frozen flag to inactive using the processor upon completion of the calculations of the second path.

8. The method of claim 7, further comprising the steps of:
storing preliminary results from the calculations of the second path using the processor if the first data becomes ready for processing at any time during the performing of the calculations of the second path; and
returning to performing the calculations of the first path using the processor upon storing the preliminary results if the first data becomes ready for processing at any time during the performing of the calculations of the second path.

9. The method of claim 1, wherein:
the step of determining whether the data is ready for processing along the first path comprises the step of determining whether a plurality of data frozen flags are active using the processor, each of the plurality of data frozen flags corresponding to a respective one of the first plurality of calculations of the first path and a respective one of the second plurality of calculations of the second path;
the step of performing the calculations of the first path comprises the step of performing those of the first plurality of calculations for which the corresponding data frozen flag is inactive using the processor; and the step of performing the calculations of the second path comprises the step of performing those of the second plurality of calculations for which the corresponding data frozen flag is active using the processor.

10. A method for controlling an electrical system of a vehicle using control data for a control path of a first plurality of calculations of the electrical system and monitoring data for a monitoring path of a second plurality of calculations for monitoring the control path, the method comprising the steps of:
determining whether a plurality of data frozen flags are active using a processor, each of the plurality of data frozen flags corresponding to a respective one of the first plurality of calculations of the first path and a respective one of the second plurality of calculations of the second path;
performing those of the first plurality of calculations for which the corresponding data frozen flag is inactive using the processor;
performing those of the second plurality of calculations for which the corresponding data frozen flag is active using the processor;
storing results of the second plurality of calculations upon completion of the second plurality of calculations; and
setting the data frozen flag to inactive using the processor upon completion of the second plurality of calculations.

11. The method of claim 10, further comprising the steps of:
generating a plurality of values from the first plurality of calculations of the control path using the processor; and
generating a plurality of redundant values from the second plurality of calculations of the monitoring path, each of the plurality of redundant values corresponding to a respective one of the plurality of values using the processor.

12. The method of claim 10, further comprising the steps of:
generating a plurality of values from the first plurality of calculations of the control path using the processor; and
performing a plurality of backward calculations from the plurality of values to generate a plurality of derived input values using the processor.

13. The method of claim 10, further comprising the steps of:
storing preliminary results from the second plurality of calculations using the processor if the corresponding data frozen flags become inactive at any time during the performing of the corresponding second plurality of calculations; and
returning to performing the first plurality of calculations using the processor if the corresponding data frozen flags become inactive at any time during the performing of the corresponding second plurality of calculations.

14. A system for controlling an electrical system of a vehicle, the system comprising:
a plurality of sensors used to obtain first data for a first path of calculations and second data for a second path of calculations, the first path comprises a first plurality of calculations of generating a value of a parameter pertaining to the electrical system, the second path comprises a second plurality of calculations of monitoring the electrical system with respect to the first path; and
a processor coupled to the plurality of sensors and configured to:
determine whether a data frozen flag is active;

perform the first plurality of calculations of the first path using the first data if the first data flag is inactive; and perform the second plurality of calculations of the second path if the first data flag is active.

15. The system of claim 14, wherein the processor is further configured to perform redundant calculations of the first plurality of calculations using the second data to thereby generate a redundant value of the parameter.

16. The system of claim 15, wherein the processor is further configured to:

perform the second plurality of calculations of the second path using the second data so long as the data frozen flag is active; and set the data frozen flag to inactive if the first data becomes ready for processing at any time during the performing of the second plurality of calculations of the second path.

17. The system of claim 16, wherein the processor is further configured to:

store results of the second plurality of calculations of the second path upon completion of the second plurality of calculations of the second path; and set the data frozen flag to inactive using the processor upon completion of the second plurality of calculations of the second path.

18. The system of claim 17, wherein the processor is further configured to:

store preliminary results from the second plurality of calculations of the second path if the first data becomes ready for processing at any time during the performing of the second plurality of calculations of the second path; and return to performing the first plurality of calculations of the first path upon storing the preliminary results if the first data becomes ready for processing at any time during the performing of the second plurality of calculations of the second path.

19. The system of claim 14, wherein the processor is further configured to perform a backward calculation from the value of the parameter to generate a derived input value using the processor.

* * * * *